United States Patent
Hamminga et al.

(10) Patent No.: US 10,704,315 B2
(45) Date of Patent: Jul. 7, 2020

(54) PRESENTING DOOR OPEN SENSORS

(71) Applicant: GM Global Technology Operations LLC, Detroit, MI (US)

(72) Inventors: Jeffrey S. Hamminga, Troy, MI (US); Besi Rrumbullaku, Rochester, MI (US); Phillip C. Storck, III, Chesterfield, MI (US); Jeffrey L. Konchan, Romeo, MI (US); James C. O'Kane, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 224 days.

(21) Appl. No.: 16/006,141

(22) Filed: Jun. 12, 2018

(65) Prior Publication Data
US 2019/0376334 A1 Dec. 12, 2019

(51) Int. Cl.
| | |
|---|---|
| *E05F 15/73* | (2015.01) |
| *E05F 15/42* | (2015.01) |
| *E05D 5/06* | (2006.01) |
| *E05D 11/00* | (2006.01) |
| *E05D 7/00* | (2006.01) |
| *E05F 15/46* | (2015.01) |
| *B60R 1/12* | (2006.01) |
| *B60R 13/04* | (2006.01) |
| *B60R 13/00* | (2006.01) |

(52) U.S. Cl.
CPC .............. *E05F 15/73* (2015.01); *E05D 5/062* (2013.01); *E05D 7/00* (2013.01); *E05D 11/00* (2013.01); *E05F 15/42* (2015.01); *E05F 15/46* (2015.01); *B60R 1/12* (2013.01); *B60R 13/005* (2013.01); *B60R 13/04* (2013.01); *B60R 2001/1223* (2013.01); *E05D 2005/067* (2013.01); *E05F 2015/763* (2015.01); *E05Y 2900/531* (2013.01)

(58) Field of Classification Search
CPC . E05F 15/42; E05F 15/43; E05F 15/44; E05F 15/46; E05F 15/73; E05F 15/74; E05F 15/75; E05F 15/76; E05F 2015/433; E05F 2015/434; E05F 2015/763; E05F 2015/765; E05F 2015/767; B60J 5/04; B60J 5/0412; B60J 5/0413; B60J 5/0416; B60R 13/043
See application file for complete search history.

(56) References Cited

U.S. PATENT DOCUMENTS

| | | | |
|---|---|---|---|
| 2017/0249797 A1* | 8/2017 | Elie ..................... | G07F 17/0057 |
| 2018/0086291 A1* | 3/2018 | Valdivia Nuno ..... | E05F 15/611 |

(Continued)

OTHER PUBLICATIONS

Door Edge Protector, https://www.ford.ie/shop/explore/technology/comfort-and-convenience/door-edge-protector.

*Primary Examiner* — Gregory A Blankenship (57) ABSTRACT

An obstacle detection sensor system for a movable panel of a motor vehicle includes an obstacle detection sensor disposed on an articulating mount, the obstacle detection sensor and articulating mount being hidden from view by an exterior surface of the motor vehicle in a first position, and the articulating mount providing the obstacle detection sensor with a sensor detection range including an exterior surface of the movable panel in a second position. Movement of the articulating mount from the first position to the second position and from the second position to the first position is coupled to movement of the movable panel.

20 Claims, 4 Drawing Sheets

(56) References Cited

U.S. PATENT DOCUMENTS

| | | | | |
|---|---|---|---|---|
| 2019/0128040 A1* | 5/2019 | Mitchell | .................. | E05F 15/40 |
| 2019/0153754 A1* | 5/2019 | Iwai | ........................ | E05B 81/77 |
| 2019/0169908 A1* | 6/2019 | Siewert | ..................... | E06B 9/08 |
| 2019/0376334 A1* | 12/2019 | Hamminga | ............. | E05F 15/42 |

* cited by examiner

PRESENTING DOOR OPEN SENSORS

INTRODUCTION

The statements in this section merely provide background information relating to the present disclosure, and may not constitute prior art.

The present disclosure relates to obstacle detection with respect to the position of movable panels, and more specifically to movable panels of motor vehicles. The rate at which automation is being adopted in motor vehicles has been accelerating in recent years, and the trend seems likely to continue. Automotive manufacturers have increasingly been producing vehicles with automated driving systems, as well as a variety of other user effort-reduction systems such as automatically actuated movable panels. In particular, more and more vehicles are being equipped with automatically actuated doors, trunk lids, hatches, hoods, and the like. However, automatically actuated movable panels also present a challenge, as without a person to control the movement of the movable panels, there is a potential for the panels to hit obstacles in their path. To avoid damage to automatically actuated door panels, trunk lids, hatches, hoods, and the like proximity sensors may be used in conjunction with the automatically actuated movable panel. However, proximity sensors can detract from the visual appeal of the motor vehicle. Thus, while current automatically actuated movable panels and proximity sensors achieve their intended purpose, there is a need in the art for a new and improved proximity sensor mounting system that protects movable body panels from hitting obstacles, while maintaining the visual appeal of the motor vehicle when the sensors are not in use.

SUMMARY

According to several aspects an obstacle detection sensor system for a movable panel of a motor vehicle includes an obstacle detection sensor disposed on an articulating mount, the obstacle detection sensor and articulating mount being hidden from view by an exterior surface of the motor vehicle in a first position, and the articulating mount providing the obstacle detection sensor with a sensor detection range including an exterior surface of the movable panel in a second position. Movement of the articulating mount from the first position to the second position and from the second position to the first position is coupled to movement of the movable panel.

In another aspect of the present disclosure the obstacle detection sensor includes a radar sensor, an ultrasonic sensor, a LiDAR sensor, a resistive sensor, and a capacitive sensor.

In another aspect of the present disclosure the articulating mount includes a mechanically actuated hinge or an electrically actuated hinge.

In another aspect of the present disclosure the movement of the articulating mount is mechanically, electrically, pneumatically, or hydraulically coupled to movement of the movable panel.

In another aspect of the present disclosure the articulating mount further includes a goose-neck hinge having a first end and a second end disposed opposite the first end of the goose-neck hinge; the obstacle detection sensor disposed on the first end, and a pivot disposed at the second end.

In another aspect of the present disclosure the goose-neck hinge is spring loaded and biased towards the first position.

In another aspect of the present disclosure the goose-neck hinge is spring loaded and biased towards the second position.

In another aspect of the present disclosure a cable manipulates the goose-neck hinge between the first position and the second position.

In another aspect of the present disclosure the articulating mount further includes a hinge mechanism having a first link connected to movable panel and a hinge pin, and a second link rotatably connected to the first link at the hinge pin, and extending from the hinge pin to the obstacle detection sensor.

In another aspect of the present disclosure in the first position, a movable panel hinge prevents the hinge mechanism from articulating, and wherein in the second position the movable panel hinge allows the hinge mechanism to articulate and provide the obstacle detection sensor with a sensor detection range including the exterior surface of the movable panel.

In another aspect of the present disclosure the articulating mount further includes a compound hinge assembly having a rotating arm having a slider end slidable and rotatable within a stationary track, the rotating arm extending from the slider end to a sensor support end.

In another aspect of the present disclosure in the first position the slider end is disposed at a first track end distant from an opening covered by the movable panel, and in the second position, the slider end is disposed at a second track end proximal to the opening and the sensor support end is positioned to provide the obstacle detection sensor the view of the exterior surface of the movable panel.

In another aspect of the present disclosure the articulating mount includes an exterior trim of the motor vehicle, wherein the exterior trim is a door handle, a body side molding, a trim strip, a vent, a side marker, a skirt panel, an emblem, a door handle, a mirror housing, or a mirror.

In another aspect of the present disclosure the movable panel further includes a motorized hinge and the obstacle detection sensor operates in conjunction with the motorized hinge to selectively limit movement of the movable panel.

In another aspect of the present disclosure an obstacle detection sensor system selectively limiting automated movement of a movable panel of a motor vehicle includes a motorized hinge selectively articulating the movable panel through a first range of motion, an obstacle detection sensor disposed on a mechanically articulating mount with a second range of motion different than the first range of motion, the obstacle detection sensor and articulating mount being hidden from view by an exterior surface of the motor vehicle in a first position, and the articulating mount providing the obstacle detection sensor with a sensor detection range including an exterior surface of the movable panel in a second position. Movement of the articulating mount from the first position to the second position and from the second position to the first position is coupled to movement of the movable panel, and wherein the articulating mount is biased toward the first position when the movable panel is in a closed position.

In another aspect of the present disclosure movement of the mechanically articulating mount from the first position to the second position, and from the second position to the first position is electrically motivated.

In another aspect of the present disclosure the obstacle detection sensor includes at least one of a radar sensor, an ultrasonic sensor, a LiDAR sensor, a resistive sensor, and a capacitive sensor, and the mechanically articulating mount is mechanically, electrically, pneumatically, or hydraulically coupled to automated movement of the movable panel.

In another aspect of the present disclosure movement of the mechanically articulating mount is coupled to movement of the movable panel, and movement of the mechanically articulating mount is delayed from movement of the movable panel.

In another aspect of the present disclosure the sensor detection range further includes an edge of the movable panel.

In another aspect of the present disclosure an obstacle detection sensor system for selectively limiting automated movement of a movable panel of a motor vehicle includes a motorized hinge selectively articulating the movable panel through a first range of motion, an obstacle detection sensor comprising a radar sensor, an ultrasonic sensor, a LiDAR sensor, a resistive sensor, and a capacitive sensor, a mechanically articulating mount with a second range of motion different than the first range of motion, the obstacle detection sensor disposed on the articulating mount, the obstacle detection sensor and articulating mount being hidden from view by an exterior surface of the motor vehicle in a first position, and the articulating mount providing the obstacle detection sensor with a sensor detection range including an exterior surface and an edge of the movable panel in a second position. Movement of the articulating mount from the first position to the second position and from the second position to the first position is coupled to movement of the movable panel, the articulating mount is biased toward the first position when the movable panel is in a closed position, and automated movement of the movable panel is selectively limited when the obstacle detection sensor detects an obstacle within the sensor detection range.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
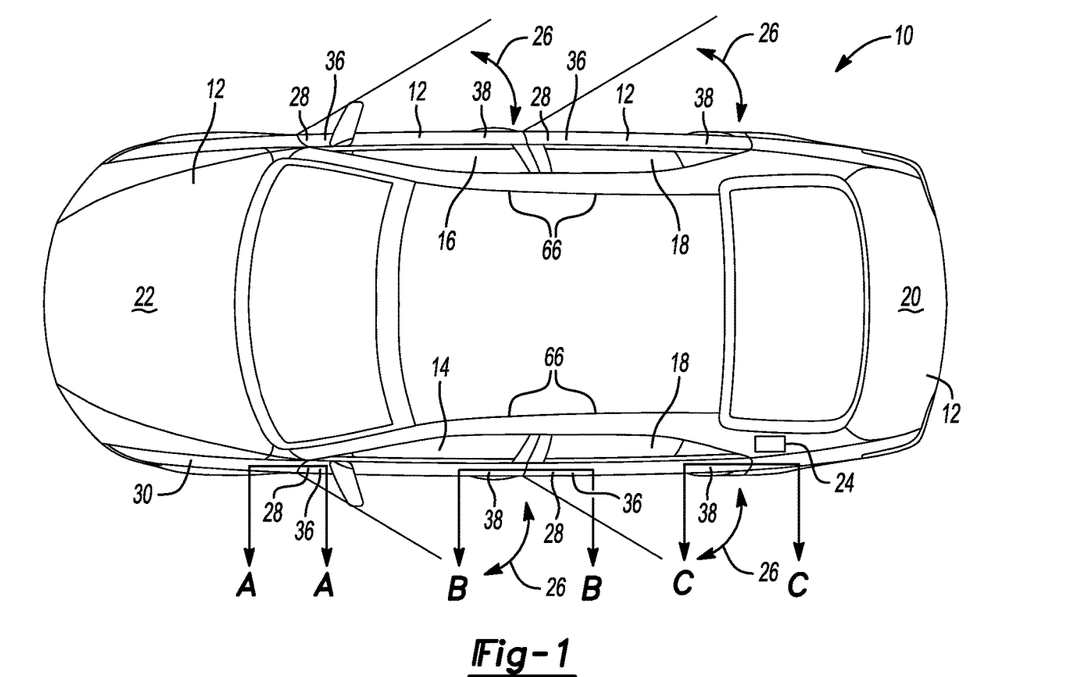
FIG. 1 is a view of a motor vehicle equipped with presenting door open sensors according to an aspect of the present disclosure.

Referring to FIG. 1, a motor vehicle is shown and indicated generally by reference number 10. While the motor vehicle 10 is depicted as a car, it should be understood that the motor vehicle 10 may be a car, including but not limited to a coupe, a sedan, a hatchback, or an estate; or a truck, an SUV, a van, a semi, a tractor, a bus, or any other such motor vehicle 10 without departing from the scope or intent of the present disclosure. The motor vehicle 10 is equipped with at least one movable panel 12. In several aspects, the motor vehicle 10 may have any number of movable panels 12, such as a driver door 14, a passenger door 16, rear passenger doors 18, a trunk 20, a rear hatch or liftgate (not shown), a hood or bonnet 22, a fuel door 24, or any other such movable panel 12.

Referring now to FIGS. 2-7 and with continuing reference to FIG. 1, each movable panel 12 articulates through a first range of motion 26 via a hinged connection 28 to the body 30 of the motor vehicle 10. In several aspects, the hinged connection 28 includes a hinge pin 32 inserted through hinge pin receivers 34 in the movable panel 12 and the body 30 of the motor vehicle 10. However, depending on the particular movable panel 12, and on design constraints, the hinged connection 28 may take any of a variety of forms including a goose neck hinge, a scissors hinge, an offset hinge, a damped hinge, or the like. In the example of FIG. 1, the hinged connections 28 of the driver door 14, passenger door 16, and rear passenger doors 18 are disposed toward a door front end 36 of each of the motor vehicle doors 14, 16, 18. Thus each of the motor vehicle doors 14, 16, 18 articulate horizontally outward through the first range of motion 26. It should be understood, however, that in other examples, the hinged connection 28 for a given movable panel 12 may allow each movable panel 12 to articulate in any of a variety of different directions without departing from the scope or intent of the present disclosure. For example, in some motor vehicles 10 the hinged connection 28 allows the movable panel 12 to articulate vertically in a gullwing, scissors, or butterfly fashion. In another example, in some other motor vehicles 10 the hinged connection 28 allows the movable panel to articulate horizontally in a swan motion, or in a so-called "suicide" motion where the motor vehicle doors 14, 16, 18 have hinged connections 28 disposed at a door rear end 38. In other examples, the hinged connection 28 allows the movable panel 12 to articulate in a combination of vertical and horizontal movements such as in a movable panel 12 with dihedral synchro-helical actuation. In still other examples, the hinged connection 28 may be better described as a sliding connection (not specifically shown) where the movable panel 12 is mounted to or suspended from a track and opens by sliding horizontally alongside or into the motor vehicle 10. In some aspects, the sliding connection may be vertically oriented so that the movable panel retracts into a roof 40 or floor (not shown) of the motor vehicle 10.

In several aspects, the movable panels 12 are actuated automatically. That is, at least one of the movable panels 12 can be actuated without being physically manipulated by a person. Motivation for the automatic actuation of the movable panel or panels 12 is provided by a solenoid, a linear actuator, a spring and damper, a cable and reel mechanism, an electric motor, a hydraulic or pneumatic system, or other such door drive mechanisms or motivators (not specifically shown). The motivators may be disposed on the movable panel 12, on an internal aspect 42 of the body 30 of the motor vehicle 10, within the hinged connection 28, or the like. In some examples, the motivators actuate the movable panel 12 via a cable mechanism (not specifically shown).

The movable panel or panels 12 include at least one presenting door open sensor such as an obstacle detection or proximity sensor 44. In several aspects, the proximity sensor 44 is a radar sensor, an ultrasonic sensor, a camera, a LiDAR sensor, a non-contact capacitive sensor, a resistive sensor, such as a pinch strip sensor, or any other such proximity sensor 44. In some examples, multiple proximity sensors 44 may be used with one or more of the movable panels 12. That is, multiple proximity sensors 44 may be mounted to a variety of locations around one or more of the movable panels 12. Moreover, the multiple proximity sensors 44 may be all of the same type (e.g. all ultrasonic sensors), or the multiple proximity sensors 44 may be of a variety of different types (e.g. ultrasonic and resistive pinch strip sensors). In one aspect, an ultrasonic sensor and a resistive pinch strip are used in conjunction with a single movable panel 12 to detect ultrasonic data as well as physical interference data. The proximity sensors 44 are mounted to an articulating mount 46. Depending on the particular application, the articulating mount 46 may take any of a variety of different forms.

Figure 2:
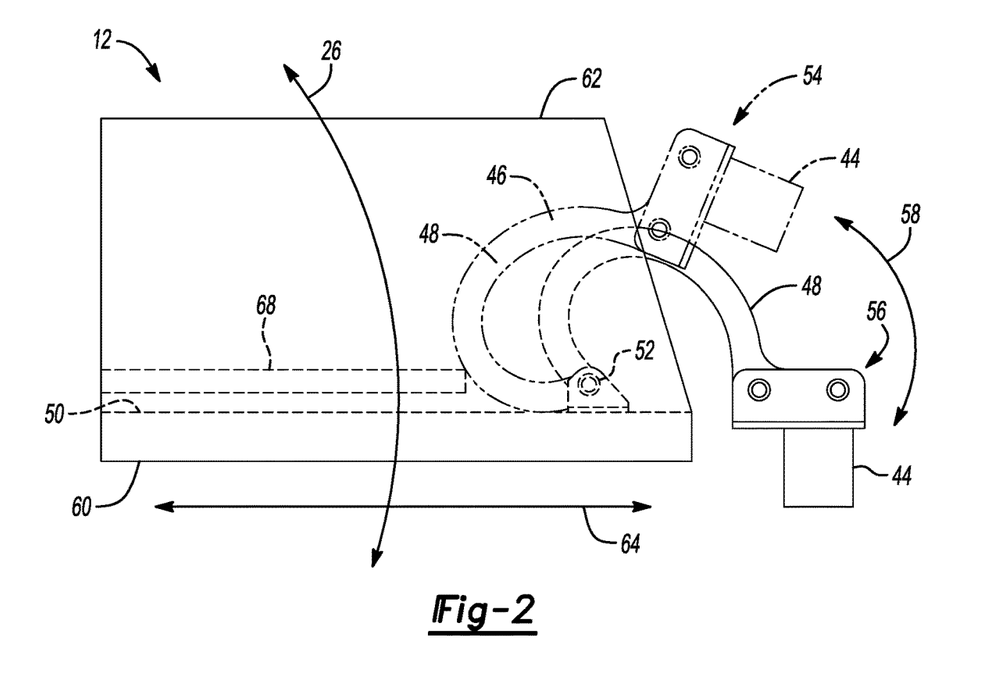
FIG. 2 is a partial cross sectional view of FIG. 1 taken across line A-A, B-B, or C-C showing a presenting door open sensor according to an aspect of the present disclosure.
Figure 3:
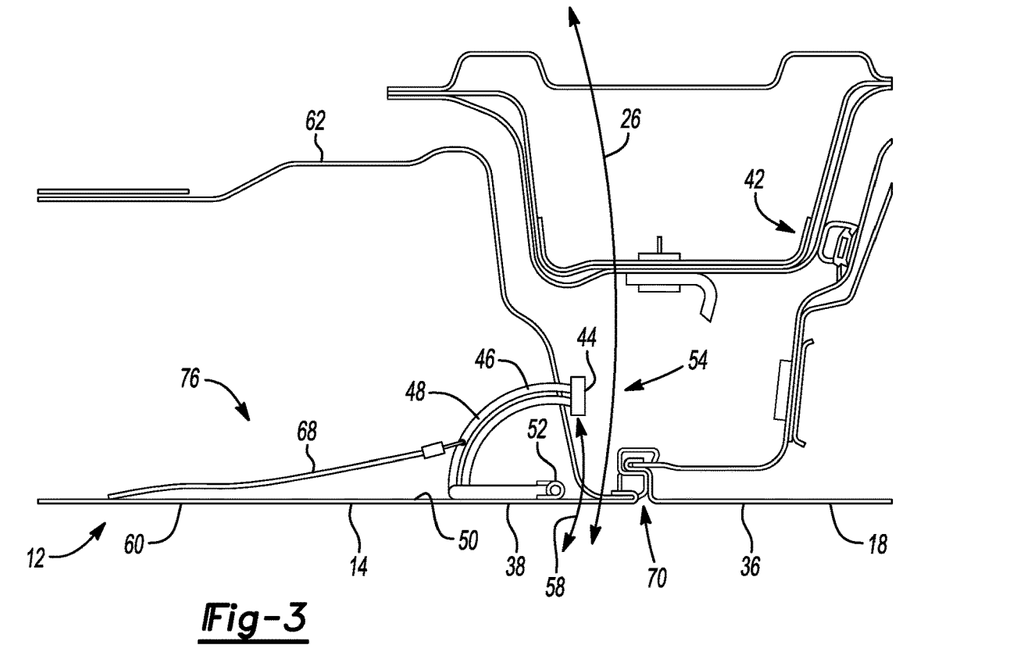
FIG. 3 is a partial cross sectional view of FIG. 1 taken across line A-A, B-B, or C-C showing a presenting door open sensor in a hidden position according to an aspect of the present disclosure.
Figure 4:
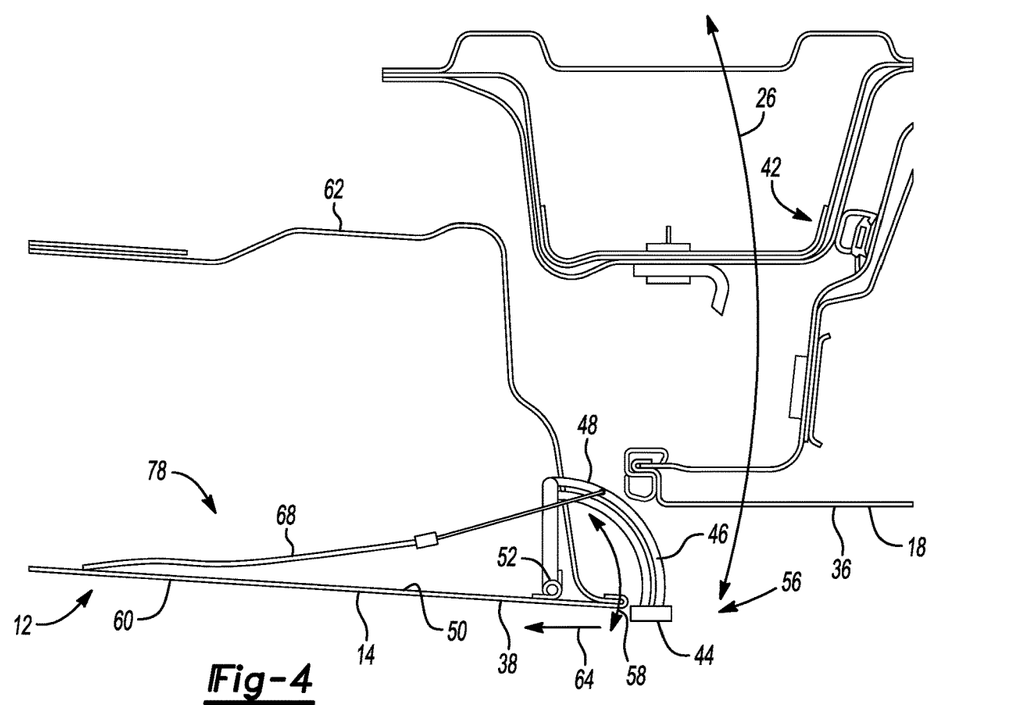
FIG. 4 is a partial cross sectional view of FIG. 1 taken across line A-A, B-B, or C-C showing another presenting door open sensor in a presenting position according to another aspect of the present disclosure.

In the example of FIGS. 2-4, the articulating mount 46 is a gooseneck hinge 48 attached to an interior surface 50 of the movable panel 12 at a mount hinge pin 52. In the depiction of FIG. 2 the proximity sensor 44 is disposed on an articulating mount 46 disposed on a driver door 14 of the motor vehicle 10. However, it should be understood that substantially the same or similar components may be used on passenger doors 16, and rear passenger doors 18, a trunk 20, a hood or bonnet 22, a fuel door 24, or any other such movable panels 12 without departing from the scope of the present disclosure. Moreover, while the articulating mount 46 is described as being mounted to an interior surface 50 of the rear end 38 of the movable panel 12, the articulating mount 46 may be disposed on other aspects of the movable panel 12, such as an interior surface 50 of a lower edge (not specifically shown) of the movable panel 12, or other similar locations.

The articulating mount 46 moves from a first or hidden position 54 to a second or presenting position 56 as the articulating mount 46 traverses a second range of motion 58. When the articulating mount 46 is in hidden position 54, the articulating mount 46 and the proximity sensor 44 are hidden behind an exterior surface 60 of the movable panel 12. Therefore, when the articulating mount 46 is in the hidden position 54, both the articulating mount 46 and the proximity sensor 44 are not visible from outside the motor vehicle 10. In some examples, when the articulating mount 46 is in the hidden position 54, the articulating mount 46 and proximity sensor 44 are hidden within an inner or interior door trim panel 62. In the presenting position 56, the articulating mount 46 presents the proximity sensor 44 so that the proximity sensor 44 has sensing range or field of view 64 that extends along a surface of the movable panel 12. In examples in which a plurality of proximity sensors 44 are used with a single panel, the proximity sensors 44 can be mounted in to provide overlapping sensing ranges or fields of view 64 thereby providing increased granularity of obstacle proximity data versus a single proximity sensor 44.

In some aspects, the sensing range or field of view 64 includes an edge of the movable panel 12, such as a top edge 66, bottom edge (not shown), front end 36 or rear end 38 of the movable panel 12. Depending on the type of proximity sensor 44 used with a given movable panel 12, the sensing range or field of view 64 may vary substantially. A given proximity sensor 44 may have a sensing range or field of view 64 constrained by the physical limits of the technology. Thus, in some aspects, the proximity sensor 44 may have limited accuracy and precision extremely close, for example within 200 mm, of the proximity sensor 44 itself. Placement of the articulating mount 46 and therefore, the proximity sensor 44, on the movable panel 12 is therefore at least partially determined by the type of proximity sensor 44 used.

Movement of the articulating mount 46 through the second range of motion 58 is coupled to movement of the movable panel 12 through the first range of motion 26. Coupling of movement of the articulating mount 46 to movement of the movable panel 12 may be achieved by a variety of different actuation mechanisms 68. For example, the articulating mount 46 may be moved by a cable, a linkage rod, an electro-mechanical actuator such as a linear actuator or solenoid, a spring loaded hinge, a cam or any other type of actuation mechanism 68 coupled to the motion of the movable panel 12. Moreover, in some aspects the articulating mount 46 actuates through the second range of motion 58 independently from the movable panel 12 but sequenced with movement of the movable panel 12 through the first range of motion 26. That is, in some examples, the articulating mount 46 actuates through the second range of motion 58 with a time-based or movable panel 12 position-based delay. Depending on the particular application, delaying of actuation of the articulating mount 46 through the second range of motion 58 is desirable to prevent the articulating mount 46 from physically interfering with a motor vehicle 10 body panel, or body opening 70.

Figure 5:
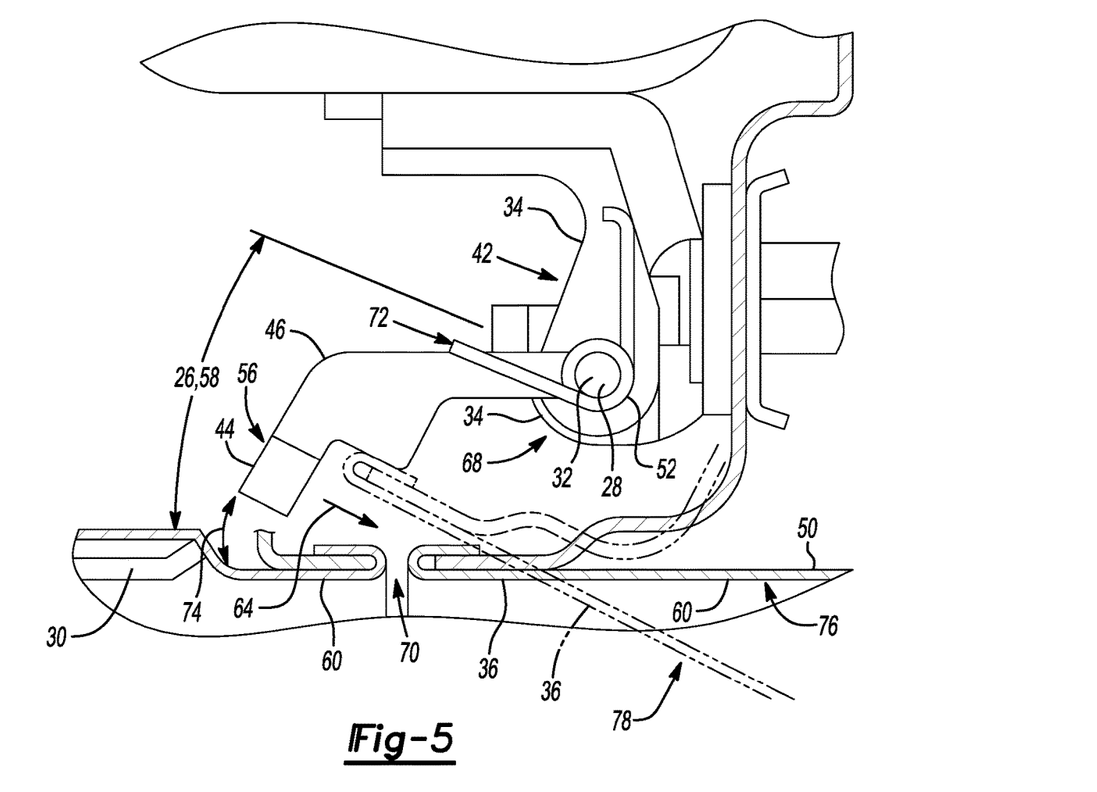
FIG. 5 is a partial cross sectional view of FIG. 1 taken across line A-A, B-B, or C-C showing a presenting door open sensor in a first position according to another aspect of the present disclosure.
Figure 6:
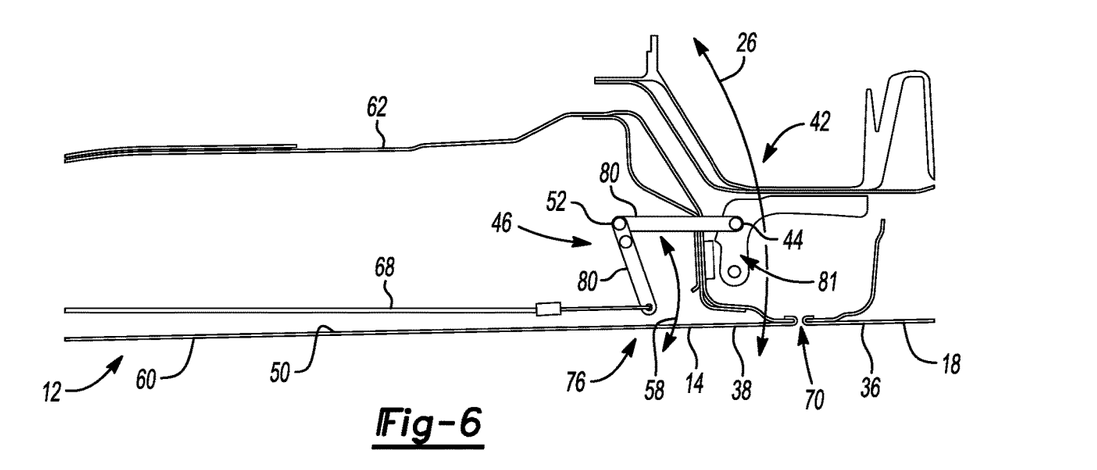
FIG. 6 is a partial cross sectional view of FIG. 1 taken across line A-A, B-B, or C-C showing a presenting door open sensor in a second position according to another aspect of the present disclosure.

Turning now to FIGS. 5 and 6 in particular, and with continuing reference to FIGS. 1-4, exemplary articulating mounts 46 are shown. In FIG. 5, the exemplary articulating mounts 46 are shown at a front end 36 of the motor vehicle 10 doors, while in FIG. 6 the articulating mounts 46 are shown at a rear end 36 of the motor vehicle 10 doors. In the example of FIG. 5, the articulating mount 46 is disposed on the hinged connection 28 of the movable panel 12. More specifically, the mount hinge pin 52 about which the articulating mount 46 traverses the second range of motion 58 also forms the hinged connection 28 of the movable panel 12. Therefore, in order to provide the proximity sensor 44 with a sensing range or field of view 64 that extends along a surface of the movable panel 12 and along at least the front end or rear end 36, 38, top edge 66, or bottom edge (not shown) of the movable panel 12, the articulating mount 46 provides the proximity sensor 44 with a field of view 64 through a body opening 70 such as a panel gap.

In some aspects, the articulating mount 46 is freely rotatable about the mount hinge pin 52, and movement of the articulating mount 46 through the second range of motion 58 is indirectly tied to movement of the movable panel 12 through the first range of motion 26. That is, because the articulating mount 46 is freely rotatable about the mount hinge pin 52, some of the movement of the movable panel 12 may not necessarily directly engage movement of the articulating mount 46. In some examples, the articulating mount 46 is also coupled to the hinged connection 28 and the movable panel 12 by a spring 72. In the hidden position 54, the articulating mount 46 is held by the spring 72 against a stop surface (not specifically shown). When the movable panel 12 is actuated though a predetermined portion 74 of the first range of motion 26 from a closed position 76 towards an open position 78 the front end 36 or door hem of the movable panel 12 lifts the articulating mount 46 off the stop surface. Once the front end 36 or door hem of the movable panel 12 has lifted the articulating mount off the stop surface movements of the articulating mount 46 and the movable panel 12 are coupled directly to one another. The spring 72 holds the articulating mount 46 against the front end 36 or door hem of the movable panel 12 as the movable panel 12 is opened from a partially opened to the open position 78. However, when the movable panel 12 is in the closed position 76, the spring 72 returns articulating mount 46 to the stop surface.

In some aspects, as the movable panel 12 articulates through the first range of motion 26, the spring 72 momentarily decouples movement of the articulating mount 46 from movement of the movable panel 12, and once the movable panel 12 has articulated through the predetermined portion 74 of the first range of motion 26 from the closed position 76 towards the open position 78, the spring 72 holds the front end 36 or door hem of the movable panel 12 against the articulating mount 46, thereby coupling movement of the articulating mount 46 directly to movement of the movable panel 12. Thus, the spring 72 couples movement of the articulating mount 46 to the movable panel 12 thereby moving the articulating mount 46 through the second range of motion 58 and presenting the proximity sensor 44 in the body opening 70. In some examples, the predetermined portion 74 of the first range of motion 26 is between about 0° and 45° from the closed position 76. In other examples, the predetermined portion 74 of the first range of motion 26 is between about 0° and about 15° from the closed position 76.

In the example of FIG. 6, the articulating mount 46 is disposed at the rear edge 38 of a movable panel 12 such as a driver door 14. The articulating mount 46 is actuated by an actuation mechanism 68 such as a cable, a linkage rod, a Bowden cable, an electro-mechanical actuator such as a linear actuator or solenoid, a spring loaded hinge, a cam or the like. The articulating mount 46 is a multi-link hinge made up of a plurality of hinged links 80 in hinged connection to one another, and to a mount hinge pin 52 or similar hinged connection to the interior surface 50 of the movable panel 12. In several examples, the multi-link articulating mount 46 can be a four or six-bar hinge, a gooseneck hinge, or the like without departing from the scope or intent of the present disclosure. The proximity sensor 44 is disposed on one of the hinged links 80 and as the movable panel 12 is moved through the first range of motion 26 from the closed position 76 to the open position 78, the articulating mount 46 actuates through the second range of motion 58 from the hidden position 54 to the presenting position 56. In some examples, when the movable panel 12 is moved from the open position 78 to the closed position 76, at least a portion of the movement of the articulating mount 46 from the presenting position 56 to the hidden position 54 is caused by physical interference of at least one of the hinged links 80 with a structural component 81 of the motor vehicle 10 body 30. In other examples, when the movable panel 12 is moved from the open position 78 to the closed position 76, movement of the articulating mount 46 from the presenting position 56 to the hidden position 54 is generated by the actuation mechanism 68 function to retract the articulating mount 46. While the articulating mount 46 of FIG. 6 has been described as being disposed at a rear edge 38 of the movable panel 12, the articulating mount 46 can also be packaged and/or mounted to a front end 36, a top edge 66, a bottom edge (not shown), or the like without departing from the scope or intent of the present disclosure.

Figure 7:
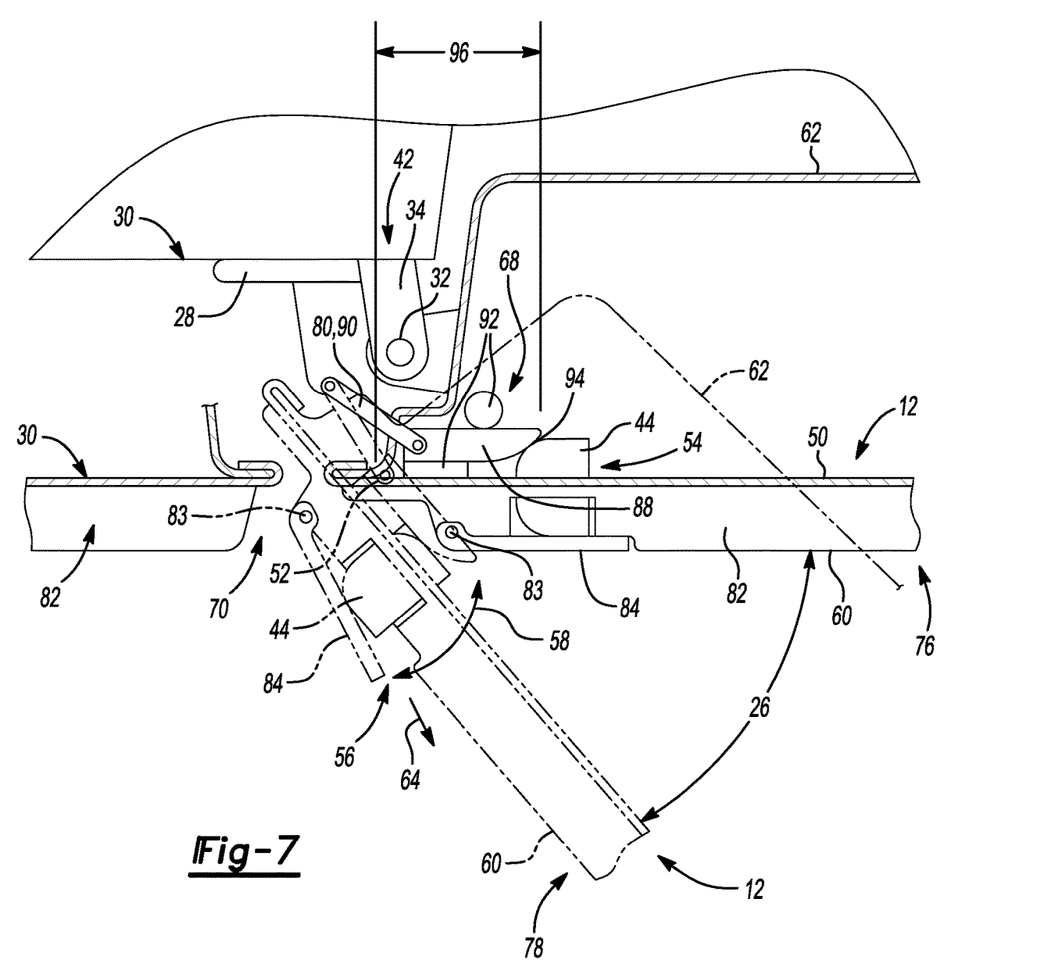
FIG. 7 is a partial cross sectional view of FIG. 1 taken across either line A-A, B-B, or C-C showing a presenting door open sensor disposed in a trim of the motor vehicle according to an aspect of the present disclosure.

Turning now to FIG. 7, and with continuing reference to FIGS. 1-6, in some examples, the articulating mount 46 is disposed within a trim 82 of the motor vehicle 10. In several aspects, the trim 82 is a door handle, a body side molding, a trim strip, a vent, a side marker, a skirt panel, an emblem, a door handle, a mirror housing, a mirror, or other such trims 82 on the motor vehicle 10. In the example of FIG. 7, the trim 82 includes a hinge 83 allowing a hinged portion or flipper door 84 to rotate. The hinged portion or flipper door 84 forms a portion of the articulating mount 46. The proximity sensor 44 is disposed on an interior aspect 86 of the hinged portion 84 of the trim 82. Depending on the application, and on the design constraints thereof, the articulating mount 46 and the hinged portion 84 can take a variety of different forms without departing from the scope or intent of the present disclosure. The hinged portion 84 is spring loaded and biased towards the hidden position 54. In one aspect, the articulating mount 46 and hinged portion 84 deploy outward from the exterior surface 60 of the movable panel 12 by rotating on the hinge 83. In another aspect, the articulating mount 46 and hinged portion 84 are connected to a slider 88 via a pivot link or links 90. As the articulating mount 46 is actuated from the hidden position 54 to the presenting position 56, the slider 88 is drawn between fixed guides 92, thereby driving the hinged portion or flipper door towards the presenting position 56. Movement of the slider 88 and/or the pivot link or links 90 is limited by a cam surface 94 preventing limiting a third range of motion 96 of the slider 88.

In an example, as discussed previously, depending on the location of the hinged portion 84 of the trim 82, actuation of the articulating mount 46 through the second range of motion 58 is delayed such that the articulating mount 46 does not physically interfere with a motor vehicle 10 body panel, or body opening 70. In a second example, actuation of the articulating mount 46 through the second range of motion 58 precedes actuation of the movable panel 12 through the first range of motion 26. In the second example, hinged portion 84 of the trim 82 extends at least partially towards the presenting position 56 prior to actuation of the movable panel 12, thereby providing the proximity sensor 44 a field of view 64 that may be used to preclude the movable panel 12 from opening if an obstacle is detected too close to the motor vehicle 10 for the movable panel 12 to open.

In several aspects, in each of the foregoing examples, the movable panel 12 is actuated automatically. The automatic actuation of the movable panel 12 is initialized by a request from a user, operator, or passenger of the motor vehicle 10, or the like. In some aspects, the movable panel 12 opens as an operator approaches the motor vehicle 10. In other aspects, the movable panel opens upon a reaching a known destination, engine shut-off, or the like. As described above, the automatic actuation of the movable panel 12 is motivated by a solenoid, a linear actuator, a spring and damper, a cable and reel mechanism, an electric motor, a hydraulic or pneumatic system, or other such motivators (not specifically shown). However, while automatic actuation of the movable panels 12 is convenient for motor vehicle 10 users, it is possible for the movable panel 12 to hit obstacles within the first range of motion 26. The proximity sensor or sensors 44 are used in conjunction with the motivators for the movable panels 12 to reduce the potential for damage to the movable panels 12. That is, the proximity sensors 44 are electrically, mechanically, hydraulically, pneumatically, or similarly coupled to the motivators to actively limit movement of the movable panel 12 when an obstacle is detected by the proximity sensor or sensors 44. In some examples, the movable panel 12 motivators may be programmed not only to cease movement of the movable panel 12 through the first range of motion 26, but to reverse the direction of motion of the movable panel 12. In further examples, the motivators include an electrical, or mechanical brake mechanism that is selectively engaged when an obstacle is detected by the proximity sensor or sensors 44. In still further examples, the proximity sensors 44 may detect and/or communicate different types of proximity data to the motivators and determine pending motion of the movable panel 12, and in certain circumstances, prevent or restrain movement of the movable panel 12 before movement has begun. For example, when a motor vehicle 10 equipped with an automated driver door 14 and the presenting door open sensors of the present disclosure has been parked in close proximity to an obstacle (i.e. when another car has parked too close to the present motor vehicle 10), such that the driver door 14 cannot be opened wide enough to allow the driver to enter the motor vehicle 10, the proximity sensors 44 will preemptively instruct the motivator not to open the driver door 14. Similar actions may be taken by other movable panels 12 on the motor vehicle 10 without departing from the scope or intent of the present disclosure.

A presenting door open sensor of the present disclosure offers several advantages. These include the ability for automatically actuated movable panels 12 to avoid hitting obstacles, thereby reducing the potential for damage to automatically actuated door panels, trunk lids, hatches, hoods, and the like. Moreover, because the proximity sensors 44 are disposed on articulating mounts 46 and the proximity sensors 44 are hidden behind the exterior of the motor vehicle 10 when not in the presenting position 56, the visual character, appeal, and continuity of the motor vehicle 10 is maintained when the sensors are not in use.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An obstacle detection sensor system for a movable panel of a motor vehicle comprises:
   an obstacle detection sensor disposed on an articulating mount, the obstacle detection sensor and articulating mount being hidden from view by an exterior surface of the motor vehicle in a first position, and the articulating mount providing the obstacle detection sensor with a sensor detection range including an exterior surface of the movable panel in a second position,
   wherein movement of the articulating mount from the first position to the second position and from the second position to the first position is coupled to movement of the movable panel.

2. The obstacle detection sensor system of claim 1 wherein the obstacle detection sensor comprises a radar sensor, an ultrasonic sensor, a LiDAR sensor, a resistive sensor, and a capacitive sensor.

3. The obstacle detection sensor system of claim 1 wherein the articulating mount comprises a mechanically actuated hinge or an electrically actuated hinge.

4. The obstacle detection sensor system of claim 1 wherein the movement of the articulating mount is mechanically, electrically, pneumatically, or hydraulically coupled to movement of the movable panel.

5. The obstacle detection sensor system of claim 1 wherein the articulating mount further comprises a goose-neck hinge having a first end and a second end disposed opposite the first end of the goose-neck hinge; the obstacle detection sensor disposed on the first end, and a pivot disposed at the second end.

6. The obstacle detection sensor system of claim 5 wherein the goose-neck hinge is spring loaded and biased towards the first position.

7. The obstacle detection sensor system of claim 5 wherein the goose-neck hinge is spring loaded and biased towards the second position.

8. The obstacle detection sensor system of claim 5 wherein a cable manipulates the goose-neck hinge between the first position and the second position.

9. The obstacle detection sensor system of claim 1 wherein the articulating mount further comprises a hinge mechanism having a first link connected to movable panel and a hinge pin, and a second link rotatably connected to the first link at the hinge pin, and extending from the hinge pin to the obstacle detection sensor.

10. The obstacle detection sensor system of claim 9 wherein in the first position, a movable panel hinge prevents the hinge mechanism from articulating, and wherein in the second position the movable panel hinge allows the hinge mechanism to articulate and provide the obstacle detection sensor with a sensor detection range including the exterior surface of the movable panel.

11. The obstacle detection sensor system of claim 1 wherein the articulating mount further comprises a compound hinge assembly having a rotating arm having a slider end slidable and rotatable within a stationary track, the rotating arm extending from the slider end to a sensor support end.

12. The obstacle detection sensor system of claim 11 wherein in the first position the slider end is disposed at a first track end distant from an opening covered by the movable panel, and in the second position, the slider end is disposed at a second track end proximal to the opening and the sensor support end is positioned to provide the obstacle detection sensor the view of the exterior surface of the movable panel.

13. The obstacle detection sensor system of claim 1 wherein the articulating mount comprises an exterior trim of the motor vehicle, wherein the exterior trim comprises a door handle, a body side molding, a trim strip, a vent, a side marker, a skirt panel, an emblem, a door handle, a mirror housing, or a mirror.

14. The obstacle detection sensor system of claim 1 wherein the movable panel further comprises a motorized hinge and the obstacle detection sensor operates in conjunction with the motorized hinge to selectively limit movement of the movable panel.

15. An obstacle detection sensor system selectively limiting automated movement of a movable panel of a motor vehicle comprises:
   a motorized hinge selectively articulating the movable panel through a first range of motion;
   an obstacle detection sensor disposed on a mechanically articulating mount with a second range of motion different than the first range of motion, the obstacle detection sensor and articulating mount being hidden from view by an exterior surface of the motor vehicle in a first position, and the articulating mount providing the obstacle detection sensor with a sensor detection range including an exterior surface of the movable panel in a second position, wherein movement of the articulating mount from the first position to the second position and from the second position to the first position is coupled to movement of the movable panel, and wherein the articulating mount is biased toward the first position when the movable panel is in a closed position.

16. The obstacle detection sensor system of claim 15 wherein movement of the mechanically articulating mount from the first position to the second position, and from the second position to the first position is electrically motivated.

17. The obstacle detection sensor system of claim 15 wherein the obstacle detection sensor comprises at least one of a radar sensor, an ultrasonic sensor, a LiDAR sensor, a resistive sensor, and a capacitive sensor, and wherein the mechanically articulating mount is mechanically, electrically, pneumatically, or hydraulically coupled to automated movement of the movable panel.

18. The obstacle detection sensor system of claim 15 wherein movement of the mechanically articulating mount is coupled to movement of the movable panel, and movement of the mechanically articulating mount is delayed from movement of the movable panel.

19. The obstacle detection sensor system of claim 15 wherein the sensor detection range further comprises an edge of the movable panel.

20. An obstacle detection sensor system for selectively limiting automated movement of a movable panel of a motor vehicle comprises:
- a motorized hinge selectively articulating the movable panel through a first range of motion;
- an obstacle detection sensor comprising a radar sensor, an ultrasonic sensor, a LiDAR sensor, a resistive sensor, and a capacitive sensor;
- a mechanically articulating mount with a second range of motion different than the first range of motion, the obstacle detection sensor disposed on the articulating mount, the obstacle detection sensor and articulating mount being hidden from view by an exterior surface of the motor vehicle in a first position, and the articulating mount providing the obstacle detection sensor with a sensor detection range including an exterior surface and an edge of the movable panel in a second position,
wherein movement of the articulating mount from the first position to the second position and from the second position to the first position is coupled to movement of the movable panel, the articulating mount is biased toward the first position when the movable panel is in a closed position, and automated movement of the movable panel is selectively limited when the obstacle detection sensor detects an obstacle within the sensor detection range.

* * * * *